No. 791,076. PATENTED MAY 30, 1905.
A. C. CHENOWETH.
CONCRETE CONSTRUCTION.
APPLICATION FILED AUG. 18, 1904.
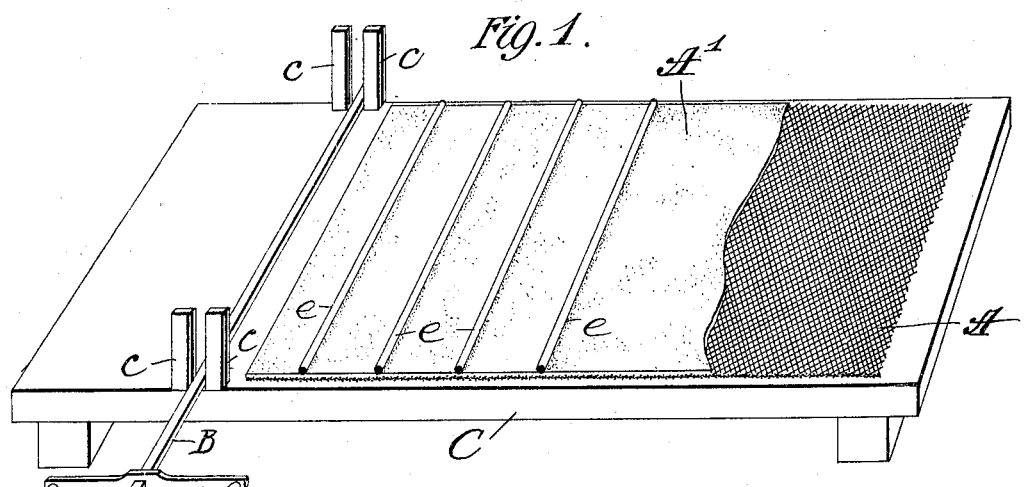
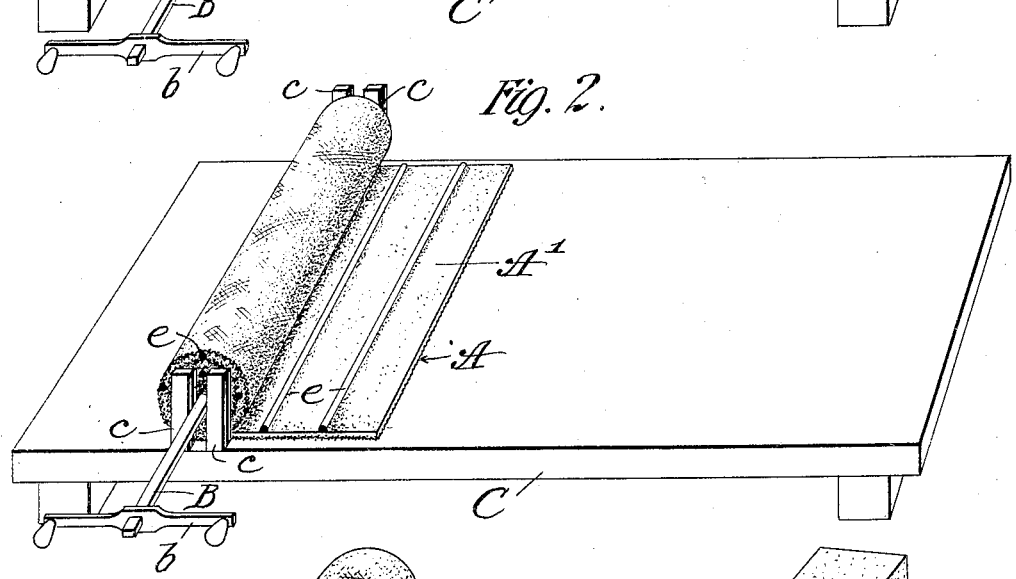
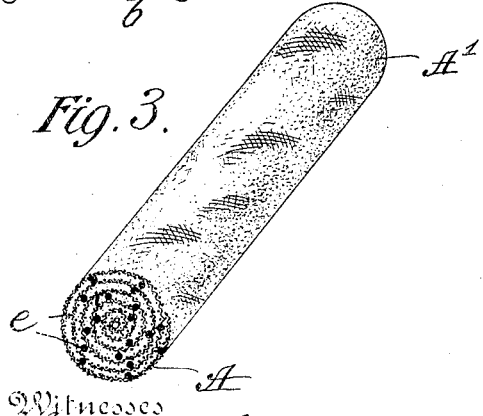
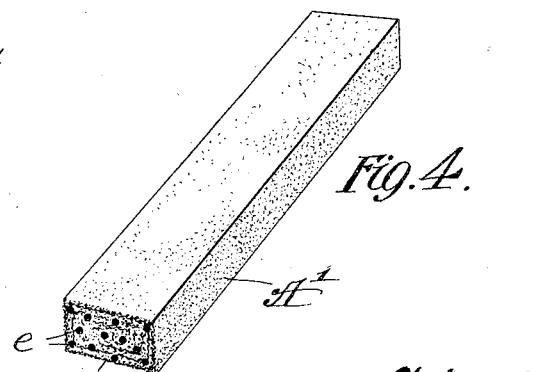

No. 791,076. Patented May 30, 1905.

UNITED STATES PATENT OFFICE.

ALEXANDER CRAWFORD CHENOWETH, OF NEW YORK, N. Y., ASSIGNOR OF ONE-HALF TO JOHN McNAMEE, OF BROOKLYN, NEW YORK.

CONCRETE CONSTRUCTION.

SPECIFICATION forming part of Letters Patent No. 791,076, dated May 30, 1905.

Application filed August 18, 1904. Serial No. 221,185.

*To all whom it may concern:*

Be it known that I, ALEXANDER CRAWFORD CHENOWETH, a citizen of the United States, residing in the borough of Manhattan, city, county, and State of New York, have invented certain new and useful Improvements in Concrete Constructions, of which the following is such a full, clear, and exact description as will enable any one skilled in the art to which it appertains to make and use the same, reference being had to the accompanying drawings, forming part of this specification.

The object of my invention is to provide a concrete or cement column, pile, girder, tie, or the like which can be economically made and so fortified and strengthened in its construction as to stand lateral as well as perpendicular stress and strain. To accomplish this object, a layer or coating of cement is deposited upon a sheet of wire gauze or netting and then rolled or turned into the form of a solid cylinder. Metal rods may be attached at intervals to the netting to strengthen the column on lines parallel to its longitudinal axis. A cylindrical column or pile formed of wire-netting and cement before the cement hardens can be pressed into rectangular or cubical form for use as a railroad tie or girder.

In the accompanying drawings, which illustrate my invention, Figure 1 shows a platform upon which the netting with cement coating rests. Fig. 2 shows a platform with column or pile partially formed. Fig. 3 shows completed column or pile with strengthening-rods embedded in the concrete with the netting. Fig. 4 shows column compressed into rectangular form for a railroad-tie.

In manufacture I attach one end of the wire-netting A to a rod B, which rod is provided with a crank-arm $b$, held between the uprights or pins $c\ c$ on the platform C. After a layer of cement A' has been deposited upon the netting the coated sheet is wound about the rod B into a solid roll, and the convoluted metal netting becomes completely embedded and forms an integral part of the concrete column. Strengthening-rods $e\ e$ may also be attached at intervals to the netting and likewise become embedded in the concrete. A cylindrical column can be compressed before the cement is set into rectangular form, as indicated in Fig. 4.

I claim as my invention—

A column or the like composed of concrete and convoluted metal netting embedded therein substantially as described.

In testimony whereof I have hereunto set my hand, this 17th day of August, 1904, in presence of the two subscribing witnesses.

ALEXANDER CRAWFORD CHENOWETH.

Witnesses:
R. G. MONROE,
THOS. COOPER BYRNES.